United States Patent Office 3,437,841
Patented Apr. 8, 1969

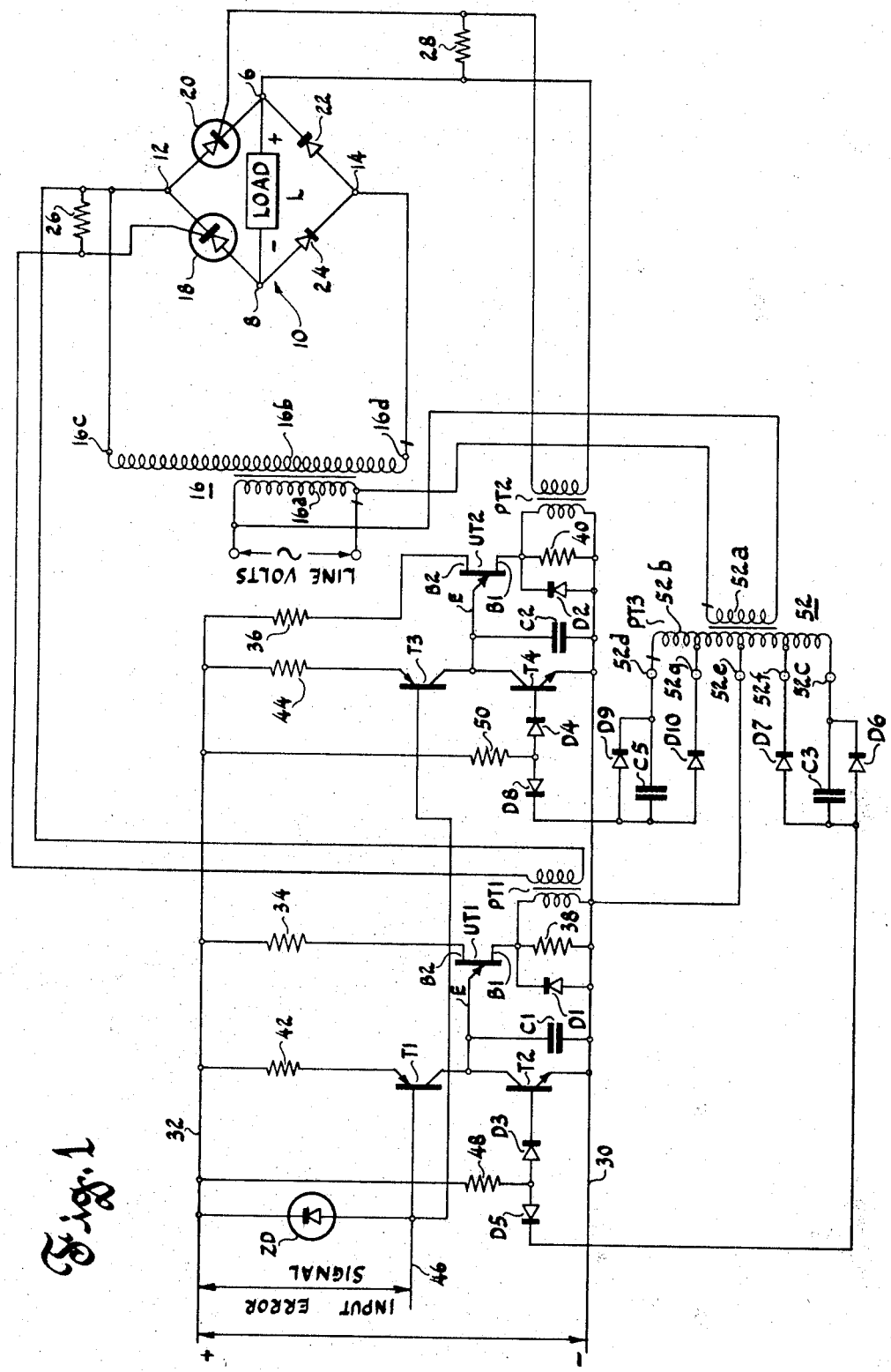

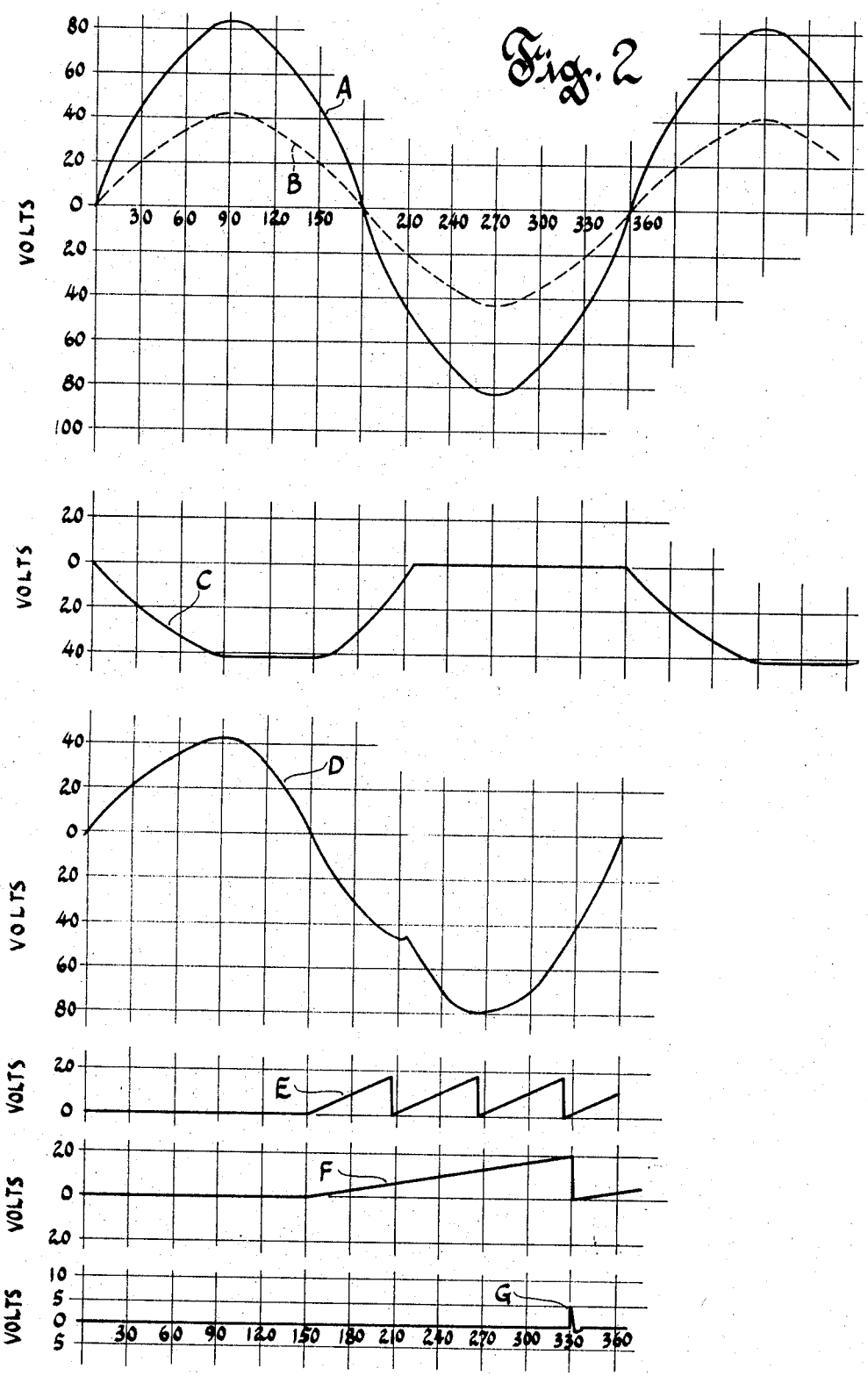

3,437,841
CONDUCTION CONTROL CIRCUIT FOR SEMI-
CONDUCTOR CONTROLLED RECTIFIERS
Robert W. Siebers, Milwaukee, and Robert W. Spink,
Wauwatosa, Wis., assignors to Cutler-Hammer, Inc.,
Milwaukee, Wis., a corporation of Delaware
Filed Mar. 10, 1966, Ser. No. 533,312
Int. Cl. H03k 17/30
U.S. Cl. 307—252   5 Claims This invention relates to a conduction control circuit for semiconductor controlled rectifiers supplying rectified current from a single phase alternating current source.

Initiation of conduction of semiconductor controlled rectifiers often involves use of a unijunction transistor which is triggered into conduction to supply a sharp current pulse to the primary of a pulse transformer whose secondary winding is connected in circuit with the gate electrode of the rectifier. Triggering voltage for the unijunction transistor is commonly developed by charging a capacitor, connected to the emitter of the latter, through a transistor whose base is subjected to a variable potential to vary the linear rate at which such capacitor is charged.

As heretofore used such conduction control circuits do not provide for initiation of the capacitor charging until the commencement of the conducting half cycles of the SCR rectifier that is ultimately controlled. This necessarily restricts the range over which the rectifier's conduction can be initiated during its conducting half cycle. As charging of the triggering capacitor cannot take place instantaneously, a dead band exists in the early portion of such conducting half cycles.

It is the object of the present invention to provide an improved conduction initiating control system for rectifiers of the aforementioned type wherein the triggering capacitor is precharged for a predetermined period prior to the commencement of each conducting half cycle thereby affording conduction initiation earlier in the conducting half cycles of the controlled rectifiers.

Other objects and advantages of the invention will hereinafter appear.

The accompanying drawings illustrate a preferred embodiment of the invention which will hereinafter appear, it being understood that the embodiment illustrated is susceptible of various modifications without departing from the scope of the appended claims.

In the drawings:

FIG. 1 is a diagrammatic showing of semiconductor controlled rectifiers supplying a load from a source of single alternating current together with conduction initiating control incorporating the invention; and FIG. 2 shows a number of curves depicting voltage relationships at various points in the conduction initiating control system of FIG. 1.

Referring to FIG. 1, it shows a load L connected across the output terminals 6 and 8 of a full-wave rectifier bridge 10. Bridge 10 has AC input terminals 12 and 14 which are connected to end terminals 16c and 16d, respectively, of secondary winding 16b of a transformer 16 which has its primary winding 16a connected to a source of AC supply. Semiconductor controlled rectifiers 18 and 20 are connected from terminals 8 and 6, respectively, to terminal 12 of the bridge with their anode-cathode circuits in opposite poled relation. Semiconductor half-wave rectifiers 22 and 24 are connected from terminals 6 and 8, respectively, to terminal 14 in the oppositely poled relation.

Whenever transformer 16 is energized and controlled rectifiers 18 or 20 are rendered conducting, rectified unidirectional current will flow through load L from terminal 6 to terminal 8 during both half cycles of alternating potential developed across terminals 16c and 16d of secondary winding 16b of transformer 16. The remainder of the circuit which will now be described pertains to the improved means for controlling the periods of conduction of controlled rectifiers 18 or 20 during each cycle of alternating potential developed across secondary winding 16b.

The gate electrode of controlled rectifier 18 is connected to one end of the secondary winding of pulse transformer PT1 which has its other end connected to the cathode of controlled rectifier 18, which is connected to the secondary winding terminal 16c of transformer 16. A resistor 26 is connected between the cathode and the gate of controlled rectifier 18. Similarly the gate electrode of controlled rectifier 20 is connected to one end of the secondary of a pulse transformer PT2 which has its other end connected to the cathode of controlled rectifier 20. A resistor 28 is connected between the cathode and the gate of controlled rectifier 20.

The pulse transformers PT1 and PT2 have their primary windings connected at corresponding ends to the negative bus 30 of a constant potential D.C. supply source which has a positive bus 32. At its other end the primary winding of transformer PT1 is connected in series with the interbase circuit, including base terminals B2 and B1, of a unijunction transistor UT1 and a resistor 34 to bus 32. Likewise, the other end of the primary winding of transformer PT2 is connected in series with the interbase circuit of a unijunction transistor UT2 and a resistor 36. The base electrodes B1 of unijunction transistors UT1 and UT2 are respectively connected in series with resistors 38 and 40 to bus 30. Rectifiers D1 and D2 are connected across resistors 38 and 40, respectively.

The emitter E, of unijunction transistor UT1 is connected to a common connection between the collectors of P-N-P type transistor T1 and N-P-N type transistor T2, and such emitter is connected to the terminal of a capacitor C1 which has its other terminal connected to bus 30. Similarly, unijunction transistor UT2 has its emitter connected to a common connection between the collectors of P-N-P type transistor T3 and N-P-N type transistor T4 and one terminal of a capacitor C2 which has its other terminal connected to bus 30. The emitter of transistor T1 is connected in series with a resistor 42 to positive bus 32, and similarly the emitter of transistor T3 is connected in series with a resistor 44 to bus 32. The emitters of transistors T2 and T4 are connected directly to bus 30.

The bases of transistors T1 and T3 are both connected to input terminal 46 which may be assumed to vary in magnitude negatively with respect to bus 32 in accordance with a control-error signal voltage. A Zener diode ZD is connected across buses 32 and 46 to limit the maximum excursion of the applied error signal. The base of transistor T2 is connected in series with a diode D3 and a resistor 48 to bus 32 and transistor T4 is correspondingly connected in series with a resistor 50 and a diode D4 to bus 32.

The common connection between resistor 48 and diode D3 is connected in series with a diode D5, and in series with the parallel connected diode D6 and capacitor C3 to end terminal 52c of secondary winding 52b of a transformer 52. The common connection between diodes D5 and D6 and capacitor C3 is connected through a diode D7 to intermediate tap terminal 52f of winding 52b. Similiary, the common connection between resistor 50 and diode D4 is connected in series with a diode D8 and in series with a parallel connected diode D9 and capacitor C5 to end terminal 52d of winding 52b. A diode D10 is connected between the common connection between diode D8 and D9 and capacitor C5 and the intermediate tap terminal 52g. Center tap terminal 52e of winding 52b is connected to negative D.C. bus 30. The primary winding 52a is connected across the same A.C. supply source as primary winding 16a as shown so that the voltage across the secondary winding, 16b is in the proper phase relation to the secondary winding, 52b. With the polarity marks shown on transformers 16 and 52, the voltage from terminal 16c respect to 16d is in phase with the voltage from terminal 52c respect to 52d.

Operation of the firing control system will now be described in connection with both FIGS. 1 and 2. Let it be assumed that the primary windings 16a and 52a of transformers 16 and 52 are both energized and that a variable D.C. control or error signal with polarity shown in FIG. 1 is impressed between bus 32 and input terminal 46. Also let it be assumed that at a given instant the end 16c of secondary winding 16b is going positive with respect to the end 16d. This is the half cycle period when controlled rectifier 18 is incapable of conduction and controlled rectifier 20 is capable of conduction. Terminal 52c of secondary 52b of transformer 52 goes positive with respect to center tap terminal 52e. The voltage relationship between terminal end 52c in respect to center tap 52e is depicted by curve A of FIG. 2.

Now if the error signal between buses 32 and 46 is a magnitude and polarity shown as to make the transistor T1 conduct, the current will flow from bus 32 through resistor 42, the collector-emitter circuit of transistor T1, and then either through the collector-emitter circuit of transistor T2 to bus 30 or into capacitor C1 to charge the latter, depending on whether or not conduction of transistor T2 is blocked or unblocked.

When end 52c of secondary winding 52b is positive with respect to center tap terminal 52e, then the end 52c is positive with respect to intermediate tap terminal 52f and charging current will flow from end 52c, into capacitor C3 to charge the latter. Curve B of FIG. 2 depicts the alternating potential of terminal 52c respect to 52f. The curve C shows the change of voltage of the common connection point of rectifiers D6 and D7 and capacitor C3 in respect to terminal 52c due to the charging of capacitor C3. This provides a blocking potential at diode D5 in respect to bus 30 as shown by curve D, which prevents current flow therethrough from bus 32. Accordingly, current will then flow from bus 32 through resistor 48, diode D3, the base-emitter circuit of transistor T2 to bus 30. Current will then be caused to flow from bus 32 through resistor 42 and the respective emitter-collector and collector-emitter circuits of transistors T1 and T2 to bus 30. Thus the potential of capacitor C1 will be clamped at essentially the potential of bus 30, thereby blocking the charging of the capacitor C1 and thus preventing any triggering of unijunction transistor UT1. This insures that no pulses will flow through the primary winding of transformer PT1 during the conducting period of control rectifier 20.

As shown by curves A, B and C, capacitor C3 charges for the first 90° of the positive voltage of terminals 52c and 52f with respect to terminal 52e. The magnitude of the charge will be the maximum difference in potential existing between terminals 52c and 52f. Capacitor C3 remains charged to such magnitude as depicted in curve C until the positive potential at terminal 52c respect to 52e decreases to approximately the magnitude of the charge on capacitor C3. As the potential of terminal 52c continues to decrease toward the potential of center tap terminal 52e, the reverse or blocking potential on diode D5 as shown by curve D is removed and current will then flow from bus 32 through resistor 48, diode D5 and into capacitor C3 to discharge the latter. Discharge of capacitor C3 starts approximately 30° before the beginning of the conducting half cycle of rectifier 18.

Just as soon as capacitor C3 begins to discharge, transistor T2 is biased off to non-conduction which permits charging current to flow from bus 32 through resistor 42, through the emitter-collector circuit of transistor T1 into capacitor C1. Thus capacitor C1 will start to charge 30° in advance of the conducting half cycle of rectifier 18. Capacitor C1 will charge at a linear rate depending upon the magnitude of control voltage applied between the base of transistor T1 and bus 32. The amount of precharging occurring before commencement of each conducting half cycle will, of course, depend upon the magnitude of the control error signal voltage applied between the base transistor T1, terminal 46 and bus 32. Curve E depicts a rapid rate of charging of capacitor C1 as occurs when the magnitude of such control error signal voltage is high and the curve F a slower rate of charging when the control error signal voltage is relatively low.

When the charge on capacitor C1 reaches approximately 18 volts it discharges the current will flow through to the emitter-base B2 junction of unijunction transistor UT1 and the primary of pulse transformer, PT1, and resistor 38 to bus 30. Because of the rapid turn-on action of unijunction transistor UT1 and construction of transformer PT1 a sharp, narrow band triggering pulse, as shown in curve G of FIG. 2, is induced in the secondary of pulse transformer and this is applied across the gate-cathode circuit of controlled rectifier 18. If at this moment the anode-to-cathode potential across rectifier 18 is above its critical value the latter will be triggered into conduction and remain conducting for the remainder of the conducting half cycle of alternating potential.

It will be apparent that the other half of secondary transformer 52b, inclusive of terminals 52d, 52g, and 52e, and capacitor C5 acts as a precharging control circuit for capacitor C2 in the same manner as aforedescribed for capacitor C1. Accordingly, capacitor C2 will likewise be held off from being charged for the first 150° of the non-conducting half cycle of alternating potential applied across the anode-cathode terminals of controlled rectifier 20, and will then be precharged for each remaining 30° of each such half cycle. The discharge of capacitor C2 causing current flow through the emitter-base B1 circuit of unijunction transistor UT2 will be exactly the same as aforedescribed, and a narrow band pulse will be induced on the secondary of pulse transformer PT2 to trigger controlled rectifier 20 into conduction at some point in its conducting half cycle.

We claim:

1. The combination with a load, a single phase alternating current supply source, a gate controlled semiconductor rectifier connected in circuit with said source and said load and means for rendering said rectifier conductive at selected points in the conducting half cycles of said rectifier and comprising a storage device for developing a linearly increasing voltage and a triggering device responsive to said linearly increasing voltage attaining a predetermined magnitude during such conducting half cycle to subject the gate of said rectifier to a current pulse rendering said rectifier conducting, of means in circuit with said source and the first mentioned means and responsive to each non-conducting half cycle of alternating potential applied across said rectifier to prevent charging of said storage device for a predetermined portion of each last mentioned half cycle and thereafter causing said first mentioned means to charge said storage device for the remainder of each half cycle.

2. The combination according to claim 1 wherein said first mentioned means comprises a transistor having its emitter-collector circuit connected in series with said storage device and providing a linearly variable output current according to the potential applied to its emitter-base circuit, and wherein the last recited means comprises a second transistor with its emitter-collector circuit connected in parallel with said storage device and means in circuit with the base-emitter circuit of said second transistor to render it conductive during said fixed portion of each rectifier non-conducting half cycle and non-conductive during the remainder of each such cycle so that said storage device will be precharged in accordance with the current output of the first mentioned transistor.

3. The combination according to claim 2 wherein a variable direct potential is applied to the base-emitter circuit of said first transistor and a constant direct potential is applied to the base-emitter circuit of said second transistor, wherein the last recited means includes a transformer, a capacitor and a plurality of diodes, said transformer having its primary winding connected to said alternately potential source and its secondary winding connected at one terminal to one side of the constant potential source and connected at the other terminal in circuit with said capacitor and diodes to the base of said second transistor, and wherein said capacitor charges and maintains its charge during said fixed portion of each rectifier non-conducting half cycle and discharges for the remainder of each such half cycle to prevent base-emitter current flow in said second transistor to stop conduction of the latter and thereby permit charging of said storage device through the first mentioned transistor.

4. The combination with a load, a single phase alternating current supply source, a pair of gate controlled rectifiers connected in opposed relation between said source and said load and like means for rendering respective ones of said rectifiers conductive at corresponding selected points in their conducting half cycles and each comprising a storage device for developing a linearly increasing voltage and a triggering device responsive to said voltage attaining a predetermined magnitude during each conducting half cycle to subject the gate of its rectifier to a current pulse rendering it conducting, of means in circuit with said source and both of said like means and responsive to each non-conducting half cycle applied across each of said rectifiers to prevent charging of the storage devices associated therewith for a predetermined portion of each non-conducting half cycle and thereafter causing the associated one of said first mentioned means to charge its storage device for the remainder of each non-conducting half cycle.

5. The combination according to claim 4 wherein each of said like means comprises a transistor having its emitter-collector circuit in series with its storage device to provide a linearly variable charging current according to the potential applied to its base-emitter circuit, wherein the last recited means comprises transistors connected in parallel with each of said storage devices and means in circuit with the base of each of the last mentioned transistors to render each thereof conductive during said predetermined portion of an associated rectifier non-conducting half cycle and non-conductive during the remainder of each such cycle so that said storage devices will be precharged in advance of the conducting half cycles of their associated rectifiers.

References Cited
UNITED STATES PATENTS 3,335,291   8/1967   Gutzwiller _____ 307—252

ARTHUR GAUSS, *Primary Examiner.*

B. P. DAVIS, *Assistant Examiner.*